United States Patent [19]
Kiff

[11] 3,923,882
[45] Dec. 2, 1975

[54] PRODUCTION OF ACETIC ACID
[75] Inventor: Ben Wilton Kiff, South Charleston, W. Va.
[73] Assignee: Union Carbide Corporation, New York, N.Y.
[22] Filed: Apr. 17, 1974
[21] Appl. No.: 461,731

[52] U.S. Cl. .......................... 260/533 R; 260/533 C
[51] Int. Cl.² .................... C07C 51/16; C07C 51/32
[58] Field of Search ................................ 260/533 R

[56] References Cited
UNITED STATES PATENTS

| | | | |
|---|---|---|---|
| 2,780,654 | 2/1957 | Robertson et al. | 260/533 R X |
| 2,800,506 | 7/1957 | Mullidge et al. | 260/533 R |
| 3,293,292 | 12/1966 | Olivier et al. | 260/533 R |
| 3,337,620 | 8/1967 | Binning et al. | 260/533 R |
| 3,483,250 | 12/1969 | Sugarman | 260/533 R |
| 3,644,512 | 2/1972 | Onopchenko et al. | 260/533 R |
| 3,646,128 | 2/1972 | Cox et al. | 260/533 R |

OTHER PUBLICATIONS
Emanuel, Novosti Neft. i. Gaz. Tekhn., Neftepererabotka i. Neftekhim, 1962, (9), 35–40, (CA. Vol. 61563i).

*Primary Examiner*—James A. Patten
*Assistant Examiner*—Richard D. Kelly
*Attorney, Agent, or Firm*—Saul R. Bresch

[57] ABSTRACT

A continuous process for the liquid phase oxidation of a hydrocarbon selected from the group consisting of alkanes or alkenes having 3 to 8 carbon atoms or mixtures thereof, said hydrocarbon being straight or branched chain or cyclic, to provide acetic acid comprising a. admixing said hydrocarbon; an oxygen-containing gas; initially a solvent comprising a carboxylic acid having 2 to 4 carbon atoms or a mixture of liquid products formed by the process; a cobalt catalyst; and ethanol in a reaction zone wherein the amount of hydrocarbon is in the range of about 5 percent by weight to about 150 percent by weight provided that there is a molar excess of hydrocarbon over oxygen; the amount of cobalt is in the range of about 0.03 percent by weight to about 3 percent by weight provided that the cobalt is in the form of a salt soluble in the solvent; and the amount of ethanol is about 1 percent by weight to about 20 percent by weight, all said percentages based on the weight of the solvent, and wherein the temperature is in the range of about 80°C to about 150°C; and the total reaction pressure and partial pressure of oxygen are sufficient to maintain the reaction in the liquid phase to form a mixture of liquid products including acetic acid; and b. passing the mixture of liquid products, the cobalt catalyst, and unreacted hydrocarbon from step (a) into a separation zone wherein a portion of the acetic acid is separated and recovered, and wherein a portion of the mixture of liquid products in sufficient amount to provide solvent for step (a), the cobalt catalyst, and the unreacted hydrocarbon are separated and recycled to the reaction zone.

3 Claims, No Drawings

PRODUCTION OF ACETIC ACID

FIELD OF THE INVENTION

This invention relates to a process for the production of acetic acid and, more particularly, to a process for the production of acetic acid from the liquid phase oxidation of low molecular weight hydrocarbons in the presence of a catalyst and a promoter.

DESCRIPTION OF THE PRIOR ART

Acetic acid is a long-established article of commerce with many uses such as in the manufacture of acetic anhydride and acetate esters, especially vinyl acetate, and as an acid, solvent, or reagent in the production of rubber, plastics, acetate fibers, pharmaceuticals, dyes, insecticides, and photographic chemicals.

There are several processes for the manufacture of acetic acid, one route being the liquid phase oxidation of low-molecular weight hydrocarbons, particularly butane.

The prior art process of particular interest here is the liquid phase oxidation of butane in the presence of a comparatively large amount of a cobalt catalyst and a promoter. This process is particularly advantageous because, other than carbon oxides and water, the product is mainly acetic acid, and the reaction can be conducted at lower temperatures and pressures than other acetic acid processes enabling processing equipment to be of lighter construction. On the other hand, these promoted reactions have very serious drawbacks, which will be pointed out hereinafter.

The promoters taught to be effective in this process are halide compounds, often bromides, and aliphatic ketones of which the foremost example, promoterwise, is methyl ethyl ketone (MEK). Another promoter suggested is para-xylene.

When a halide promoter is used the reaction mixture is extremely corrosive. Consequently, the reaction cannot be conducted in an ordinary stainless steel reaction vessel. The substitution of expensive alloys for the ordinary stainless steel greatly increases the investment in processing equipment. Further bromide promoters are relatively expensive.

The use of para-xylene as a promoter is not practical on a commercial scale because the by-product terephthalic acid greatly complicates the refining of the products.

The promoter of choice, therefore, became MEK even through a considerable quantity is converted to acetic acid during the reaction with poor efficiency. Since MEK is more expensive than acetic acid, it is a costly choice.

An even more serious drawback to the use of MEK as a promoter, however, is that, even though the oxidation proceeds very well on a batch scale when all of the reactants are charged to a vessel and nothing is removed until after the completion of the reaction, the same is not true for a continuous operation. When a reaction is started in apparatus to which reactants are continuously added and from which products are removed at about the same rate, the reaction cannot be sustained for more than a few hours. This is true even though cobalt catalyst and MEK are added in sufficient quantities to maintain their concentrations at levels which function well for batch oxidations. Since the batch-type operation is too expensive for commercial production on a large scale, the MEK promoted process is just not feasible.

SUMMARY OF THE INVENTION

An object of this invention, therefore, is to provide a promoted liquid phase process for the production of acetic acid by the oxidation of low molecular weight hydrocarbons, which can be run in a continuous manner, is as efficient as prior art corresponding batch-type processes, and which is relatively economical insofar as reactants and apparatus are concerned.

Other objects and advantages will become apparent hereinafter.

According to the present invention, a continuous process for the liquid phase oxidation of a hydrocarbon selected from the group consisting of alkanes or alkenes having 3 to 8 carbon atoms or mixtures thereof, said hydrocarbon being straight or branched chain or cyclic, to provide acetic acid has been discovered which comprises a. admixing said hydrocarbon; an oxygen-containing gas; initially a solvent comprising carboxylic acid having 2 to 4 carbon atoms or a mixture of liquid products formed by the process; a cobalt catalyst; and ethanol in a reaction zone
wherein the amount of hydrocarbon is in the range of about 5 percent by weight to about 150 percent by weight provided that there is a molar excess of hydrocarbon over oxygen; the amount of cobalt is in the range of about 0.03 percent by weight to about 3 percent by weight provided that the cobalt is in the form of a salt soluble in the solvent; and the amount of ethanol is about 1 percent by weight to about 20 percent by weight, said percentages based on the weight of the solvent, and
wherein the temperature is in the range of about 80°C to about 150°C; and the total reaction pressure and partial pressure of oxygen are sufficient to maintain the reaction in the liquid phase
to form a mixture of liquid products including acetic acid; and b. passing the mixture of liquid products, the cobalt catalyst, and unreacted hydrocarbon from step (a) into a separation zone
wherein a portion of the acetic acid is separated and recovered, and
wherein a portion of the mixture of liquid products in sufficient amount to provide solvent for step (a), the cobalt catalyst, and the unreacted hydrocarbon are separated and recycled to the reaction zone.

DESCRIPTION OF THE PREFERRED EMBODIMENT

The reaction vessel used is one that is conventional for continuous processes. It is equipped so that reactants and other components can be added continuously and so products and other components can be removed in the same way. The reaction vessel can be made of any material that is resistant to attack by hot acetic acid. Stainless steel, e.g., AISI Type 316, is preferred and can be used here because corrosive components, at least those corrosive to stainless steel, are avoided. Other alloys falling into the above category such as those of zirconium, titanium, and nickel and glass can, of course, be used. It will be seen that the other apparatus used in the process such as piping, stills, condensers, etc., are also conventional. A continuous process is inherently in a state of agitation because of the continuous ingress and egress of reactants. This agitation is advantageous to an efficient reaction in view of the homogeneity provided thereby. This type of agitation can be supplemented, however, by stirring, or through the use of a circulation loop together with high velocity pumping. Since the product mixture is virtually free of formic acid, a simple refining system can be used. The extremely small amount of formic acid that is present in the crude product is apparently destroyed by the cobalt catalyst composition during distillation. The high acetic acid content in the product makes recovery of other products unnecessary, and these other products are simply recycled or purged in accordance with maintaining a continuous steady-state operation.

The hydrocarbons used in the process are alkanes or alkenes having 3 to 8 carbon atoms or mixtures thereof. The hydrocarbons can be straight or branched chain or cyclic. Although they can be substituted with various radical inert to the defined reaction, substitution is not preferred. Examples are propane, butane, pentane, hexane, heptane, octane, propylene, butene-1, butene-2, hexene-1, heptene-1, octene-1, cyclobutane, cyclopentane, cyclohexane, cycloheptane, cyclooctane, cyclohexene, isobutane, isooctane, isobutylene, 2-methylbutene-1, and 3-methylbutene-1. Butane is the preferred hydrocarbon.

The oxygen-containing gas can be oxygen, air, or mixtures of oxygen with inert gases such as nitrogen. It ($O_2$) is fed into the reaction chamber at, or slower than, its rate of consumption, which is simply checked by analyzing the effluent. The partial pressure of the oxygen should be sufficient to maintain the reaction and, preferably, sufficient to sustain an acceptable reaction rate, which can be simply determined by the operator by conventional analytical techniques and efficiency computations.

The solvent can be and is preferably acetic acid or a mixture of liquid products formed by the process.

In practice, acetic acid is used initially, i.e., in the first cycle of the continuous process, and a portion of the mixture of liquid products formed by the process is used in each recycle thereafter. This is the preferred mode. Where a mixture of liquid products is available, however, it can be used initially. As noted heretofore, a portion of the mixture of liquid products is used in a quantity sufficient to provide the amount of solvent needed in the reaction zone to solubilize the reaction zone components and maintain, in cooperation with the temperature and pressure, a liquid phase. The actual amount is determined by the technician based on the designed capacity of the plant. The amounts of other components are based on the weight of solvent. Other low molecular weight carboxylic acids having 2 to 4 carbon atoms can be used instead of acetic acid and in the same quantities. Examples of such acids are propionic, n-butyric and isobutyric acids.

The cobalt catalyst composition is one that is soluble in the liquid phase. The solubility of the composition does not have to be high, but at least 0.03 percent by weight of cobalt, based on the weight of the solvent, must be present in the active state in the solvent.

For all practical purposes, this simply means that the cobalt is preferably in the form of a salt soluble in the solvent, e.g., a salt such as cobaltous acetate tetrahydrate. If 0.1 percent by weight of this salt, based on the weight of the solvent, is used the 0.03 value mentioned above will be obtained. In practice greater amounts are preferred as will be noted below. In addition to the preferred salt mentioned heretofore, the cobalt catalyst composition can be cobaltic acetate, cobalt disulfide, cobaltic oxide, cobaltous arsenate, cobaltous arsenite, cobaltous carbonate, cobaltous chromate, cobaltous oxalate, cobaltous oxide, cobaltous sulfide, potassium cobaltic cyanide, sodium cobaltic nitride, and cobaltic potassium cyanide. Other cobalt salts are those of propionate, butyrate, isovalerate, benzoate, toluate, terephthlate, napthenate, salicylate, and acetyl acetonate. The structure of the actual catalyst as it exists in situ and the mechanism by which it acts is unknown. Presumably where the aforementioned acetate is the salt and acetic acid is the solvent, the cobalt exists in the form of a coordiation compound in which many of the ligands are aceto groups, possibly interchanged with water molecules. It is indicated that at least two cobalt atoms are associated in the coordination compound molecule and it is possible that at any given time one or both may be either in the 2+ or 3+ state. The catalyst apparently functions by attack of 3+ cobalt on, e.g., butane by an electron transfer mechanism. It is believed that the promoter maintains the catalyst in the active state. Instead of limiting the catalyst vehicle to a salt, it may be more accurate to say that the cobalt should be in the form of a compound soluble in the solvent through which compound the cobalt enters upon an active catalytic state in situ.

The promoter used in this process is ethanol. The amounts stated hereinafter are given in terms of pure 100 percent absolute alcohol (dehydrated).

Generally, the liquid components are introduced into the reactor first and then the gaseous components, at the beginning of the process, that is. When steady state is reached, introduction of gas and liquid components is about simultaneous although adjustments can be made from time to time based on an analysis of the effluent.

The reaction is conducted at a temperature in the range of about 80°C to about 150°C and the preferred temperature is in the range of about 100°C to about 140°C. Below about 80°C the reaction rate is so slow that it is impractical except as a laboratory exercise. Above about 140°C, the cobalt catalyst attacks the acetic acid causing a loss of efficiency; however, since heat values can be recovered at higher temperatures, the upper range of about 150°C can be accepted. It is also noted that, e.g., butane has a critical temperature of about 150°C, and this is a factor in determining an upper limit.

The total reaction pressure must be such that it will maintain the reaction in the liquid phase. The autogenous pressure of the hydrocarbon at the selected temperature must be considered in determining the pressure under which the reaction will take place. In addition to the autogenous pressure, there must be enough oxygen-containing gas to provide an oxidizing environment in the solution. The concentration of the oxygen in the oxygen containing gas can be about 10 percent to 100 percent by weight based on the weight of the oxygen-containing gas. It is preferred, however, to have an inert diluent gas such as nitrogen present in the oxygen-containing gas, and, therefore, the preferred composition of the oxygen-containing gas is about 10 percent to about 70 percent by weight oxygen with the balance, about 30 to about 90 percent being an inert diluent gas. Air can be used if desired. The total pressure is then the autogenous pressure of the hydrocarbon together with the pressure of oxygen and the inert diluent gas or the balance of the components of air. In the case of butane where the autogenous pressure at the suggested reaction temperatures is appreciable, the total pressure for the system should be about 220 psia to about 1,000 psia or higher and the preferred range is about 300 psia to about 500 psia. In view of the range of hydrocarbons which can be used in this process, the operator will have to select, according to the hydrocarbon used, the total pressure which will be sufficient to maintain the reaction in the liquid phase and include a sufficient supply of oxygen to maintain the reaction rate at an acceptable level.

The amount of hydrocarbon used in the reaction can be in the range of about 5 percent to about 150 percent, based on the weight of the solvent, and is preferably in the range of about 50 percent to about 125 percent. For best results, there should be a molar excess of hydrocarbon over oxygen in terms of dissolved hydrocarbon and/or undissolved hydrocarbon. This can be determined from an analysis of reactor contents and effluent. In effect this means that, as previously mentioned, all oxygen introduced should be consumed, and that a molar excess of oxygen is not preferred, but, rather, a molar deficiency.

The amount of ethanol needed to initiate and maintain the continuous process is relatively small. To initiate the oxidation at least about 1 percent by weight based on the weight of the solvent should be used. An arbitrary upper limit can be about 20 percent by weight although the only real limitation of the up side is a matter of economics. The preferred range is about 1.5 percent to about 8 by weight. To maintain the oxidation, ethanol can be fed at such a rate that the concentration is maintained at about 1.5 percent to about 5 percent by weight. Again, the up side limitation is arbitrary and the only limitation is an economic one. It is, therefore, clear that the initiating ranges and the maintenance ranges can be one and the same, the latter 1.5 to 5 percent range merely being a preferred low maintenance range. The advantages of ethanol in the instant process lie in its low cost, the small quantity needed for the reaction, and its highly efficient conversion to acetic acid especially when compared with MEK; and, most important, in the discovery that an ethanol promoted continuous process can be sustained indefinitely, which, in effect, means that the process is only limited by the available apparatus rather than having any inherent limitations of its own in regard to continuity. It is interesting to note that one of the by-products of the ethanol promoted oxidation of butane is MEK, and that the MEK can be recycled to the reaction zone without inhibiting the reaction. Since free ethanol does not survive a cycle of the continuous process, it must be introduced into the reaction zone at the beginning of each cycle along with hydrocarbon, make-up catalyst, and oxygen-containing gas.

As noted above at least 0.03 percent by weight of cobalt, based on the weight of the solvent, must be present in a dissolved form in the solvent. This is the equivalent of 0.1 percent by weight of cobaltous acetate tetrahydrate, a preferred vehicle for getting the cobalt into solution. Since the maximum solubility of this salt in acetic acid is about 7 percent, an upper limit for amount of the salt that can be used is indicated. The preferred range for the salt is about 1 percent to about 4 percent by weight. In terms of cobalt, however, the broad range is from 0.03 percent to about 3 percent by weight and the preferred range is about 0.3 percent to about 1.5 percent by weight. Again, these percentages are based on the weight of the solvent medium. The ranges for cobalt per se are more universal and can be applied when other vehicles are used. Again, the defined quantity of cobalt must be present in the medium in an active catalytic state, which means that it must be introduced into the reaction mixture in the form of a soluble salt or other compound from which it can enter the active state in situ.

The chief by-products from the subject reaction, e.g., where butane is the hydrocarbon, are those usually seen in other butane oxidations but in much smaller amounts. The low boiling by-products are methyl acetate, acetone, ethyl acetate, methyl ethyl ketone, and 2-butyl acetate. The high boiling by-products are proprionic acid, butyric acid, and, in some cases, butyrolactone. Carbon dioxide and water are also formed. There is also a small amount of tars along with small amounts of other impurities.

A typical breakdown of the crude liquid effluent of a butane oxidation using subject process (exclusive of carbon oxides) is as follows:

| Compound | Percent by weight |
| --- | --- |
| acetone | 0.4 to 0.5 |
| water | 8.0 to 10.0 |
| methyl acetate | 0.3 to 0.5 |
| ethyl acetate | 0.4 to 0.6 |
| methyl ethyl ketone | 0.9 to 1.2 |
| sec-butyl acetate | 0.3 to 0.5 |
| acetic acid | 81.0 to 84.0 |
| propionic acid | 0.8 to 1.3 |
| butyric acid | 0.9 to 1.5 |
| butyrolactone | 0.1 to 0.2 |
| cobalt acetate | 1.2 to 1.8 |

Preferably, the only water introduced from an outside source is water of hydration in the cobalt catalyst. Other water is introduced in the portion of the mixture of liquid products used as the solvent since it is, of course, a liquid product of the reaction. The preferred upper limit for water in the reaction zone is about 20 percent by weight based on the weight of the mixture in the reaction zone and the optimum range for water is about 2 to about 10 percent.

A simple but effective system in which the subject process can be used, e.g., in butane oxidation, is as follows: The components are fed to one or more reactors, in series or parallel; the exit gas passes through a condensing system from which liquid butane is removed and returned to the reactor; the butane remaining in the gas is removed in a butane recovery system (other than a condensing system) also for return to the reactor; liquid effluent overflows from the reactor to a lights removal column where dissolved butane and oxygenated compounds boiling lower than acetic acid are distilled off and are recycled to the reactor. The bottoms from the lights removal column then pass to a catalyst removal column. Here, about 60 percent of the bottoms is distilled off leaving a solution of cobalt acetate in acetic acid (propionic acid, butyric acid, and butyrolactone are also present), which is removed from the base of the catalyst removal column and recycled to the reactor along with catalyst make-up, if required. The distillate from the catalyst removal column is fed to an acetic acid drying column. Dry acetic acid is taken from the bottom of the acetic acid drying column and is finally distilled in the acetic acid refining column to make glacial acetic acid.

The results of subject reaction are calculated in the following manner:

$$\text{Percent by weight conversion of hydrocarbon} = \frac{\text{moles hydrocarbon fed} - \text{moles hydrocarbon recovered}}{\text{moles hydrocarbon fed}} \times 100$$

Since two moles of acetic acid can be made from each mole of butane, the efficiency in a butane process is calculated as follows:

$$\text{Percent efficiency to acetic acid} = \frac{\text{moles of acetic acid formed}/2}{\text{moles butane fed minus moles butane recovered}} \times 100$$

The following examples illustrate the invention. Parts and percentages are by weight except as otherwise specified.

EXAMPLE 1

The oxidation is conducted in a stainless steel (AISI type 316 L) autoclave with a capacity of one gallon equipped with coil for heating and cooling, stirrer, a number of inlet lines, thermowell, overflow port for liquid, and an exit for blow-off gas. For continuous reactions the unit can be operated in two different ways. In one method, (method I) the blow-off gas can be diverted through brinecooled condensers where excess butane is condensed and allowed to reflux back into the reaction mixture. This is an effective means for removing heat of reaction. When this method is employed the reactor is only partially full of liquid (one-half to two-thirds) and this is judged by means of a sight-glass attached to the reactor. Liquid is continuously removed from the bottom of the autoclave to maintain the level. The apparatus also has a recycle loop through which liquid can be removed from the bottom of the reactor and pumped around to the top. The tubing on this loop passes through a condenser. This gives the option of using an additional means of removing heat from the reaction mixture.

In an alternate mode (method II) of continuous operation, as in this Example 1, the reactor is operated liquid-full and gas and liquid are allowed to overflow together through a port at the top of the vessel. The combined material then passes through a motor valve by means of which it is lowered to atmospheric pressure. After the motor valve the mixture passes to a vapor-liquid separator. Liquid product is removed from the bottom of the separator while the blow-off gas is allowed to escape at the top. The blow-off gas is led through traps at −70°C to collect as much of the excess of butane as possible. The stripped gas is then passed through a meter, sampled and vented. In both methods of operation a portion of the blow-off gas is passed continuously through an oxygen analyzer.

In addition to Methods I and II, the described apparatus can also be used for batch reactions (method III). All of the components except oxygen are simply charged to the reactor. All of the exit lines are closed off. The material is heated to reaction temperature and oxygen is admitted at its reaction rate. Since no gas is allowed to escape it cannot be analyzed for oxygen content. Instead, oxygen is admitted to a specified pressure and the rate of reaction is judged by loss of pressure as the oxidation proceeds. Nothing is removed until the reaction is completed. At that time the reactor is cooled and the gas is allowed to blow down into a balloon. It is measured and sampled for analysis. The liquid product is discharged, weighed and analyzed.

In methods I and II, a single pass operation is employed.

In this Example 1, the reactor is operated full with a mixture of gas and liquid continuously overflowing to a separation zone where gas and liquid are separated. The liquid is collected in a receiver and the gas is allowed to escape through a motor valve after which it is measured and analyzed continuously.

To start the reaction there is charged to the autoclave 1,500 parts of a 3.5 percent solution of cobaltous acetate tetrahydrate in acetic acid, 900 parts of butane, and 125 parts of ethanol. The mixture is heated to 120°C and enough nitrogen is admitted to raise the pressure to 500 psig. While the pressure is maintained at that point, 54 liters per hour of nitrogen is fed and oxygen is admitted at the rate of 80 liters per hour. The reaction starts within about 3 minutes and the oxygen rate is raised to 154 liters per hour. When the reaction is established butane feed is started at the rate of 400 parts per hour and a solution of 3.5 percent cobaltous acetate and two percent ethanol in acetic acid is fed at the rate of 400 milliliters per hour.

Under these conditions the reaction is sustained with complete consumption of oxygen for 18 hours. At the end of that time the run is voluntarily terminated. During the operation, the product is collected for analysis in two separate periods of 4 hours each, the first four hours and the last four hours. The gas and liquid is analyzed and a balance of reactants and product is obtained. The conversion of butane is 40 percent and the efficiency from butane to acetic acid is 76 percent.

Note that the exit gas stream from the reactor is monitored by means of an oxygen analyzer and when it indicates that all of the oxygen is being consumed the feed rate of the oxygen is increased to the desired level. This is the point where the reaction is considered established and the constant butane feed is started, i.e., at the rate of 400 parts per hour.

As the operation proceeds the reactor is filled and the effluent overflows and passes to a separator where unreacted butane is removed and recycled to the reaction vessel. The remaining portion of the effluent passes to a still in which acetic acid, other compounds formed in the reaction, and water are distilled. The distillation is regulated so that the material in the base of the still is a solution of cobalt acetate acid with about the same concentration as that used to start the oxidation. This is also recycled to the reactor at the rate at which it is accumulated in the distillation. In this way, after the operation is established, the catalyst concentration is maintained at a constant level in the oxidation zone.

EXAMPLE 2

Example 1 is repeated except that methyl ethyl ketone is used in place of ethanol; the reaction was started at 124°C; the gas flow is 50 liters per hour of nitrogen and 150 liters per hour of oxygen; and after the reaction is established 10 percent MEK is used instead of 2 percent ethanol.

The reaction continues at a good rate for 4 hours, but at that time the oxygen in the blow-off gas starts to rise and within 30 minutes rises to 10 percent. At that point the oxygen flow is cut off. The nitrogen flow is maintained until the system is clear of oxygen. At that time, oxygen is admitted to the reactor again at the rate of 50 liters per hour. However, the oxidation cannot be started again.

EXAMPLE 3

Method III referred to in example 1 is used to determine whether each of the following promoters are candidates for the continuous process used in examples 1 and 2: methanol, n-propanol, sec-butanol, 2-heptanone, 3-heptanone, acetaldehyde, acetone, benzophenone, acetophenone, cyclohexanone, 2,3-pentanedione, 2,4-pentanedione, ethylene glycol monobutyl ether, isobutyraldehyde, azo-bis-isobutyronitrile, ethyl acetate, ethylene glycol, triethylene tetramine, and methyl acetate.

There is either no reaction or the reaction rate is so slow that there is no point in attempting a continuous reaction except for 2-heptanone and 3-heptanone, which are about as effective as MEK.

Example 2 is repeated twice, once with 2-heptanone and once with 3-heptanone with the same results.

EXAMPLE 4

Method I referred to in Example I is used here. This is a summary of a series of ten runs. The following mixture is introduced into the reactor at the beginning of each run: 1,350 parts of acetic acid, 50 parts of cobaltous acetate tetrahydrate, 100 parts of methyl ethyl ketone, and 700 parts of butane. The material is heated to 110°C. Nitrogen is added to raise the pressure to 300 psig and the system pressure regulator is set at that point. a nitrogen flow of 40 liters per hour is then started. This provides a steady flow of inert gas to the oxygen analyzer. A small flow of oxygen is then admitted and when the reaction starts, as shown by the analysis of blow-off gas, this flow is increased to the desired level. At that point continuous feeds of butane and a solution of 3.5 percent cobaltous acetate in acetic acid is started. Soon after, liquid product take-off is started. Blow-off gas is measured and sampled periodically for analysis. A typical feed rate is notrogen, 40 liters per hour; oxygen, 150 liters per hour; butane, 200 parts per hour; and catalyst solution, 200 milliliters per hour.

The reaction in each run starts very quickly after the first oxygen is admitted. When the full flow of oxygen is admitted it is totally consumed at the beginning of the operation. Operation is very smooth for an appreciable time after the butane and catalyst solutions are started but then, for no discernible reason, the oxygen content of the blow-off gas starts to rise and within a few minutes it is in the explosive range and the run is terminated. The duration of continuous operation varies from one to eight hours. There is no apparent reason for the difference is reaction time from one run to the next.

Once the reaction quit, it could not be started again except by shutting down, discharging the reactor, cleaning it, and putting in a fresh charge of reactants.

Various attempts are made to maintain the reaction by using faster agitation, varying pressure and temperature, sudden cooling, using method II, and varying ratios of components, and attempts are made to locate catalyst poisons in the system, to no avail.

EXAMPLE 5

In a preliminary test, a batch run (Method III) is made with the following charge
 1000 parts acetic acid
 25 parts cobaltous acetate
 75 parts ethanol
 600 parts butane This mixture is heated to 110°C and oxygen is added. There is no reaction for about 20 minutes but after that time a vigorous reaction starts. Oxygen is then passed in at a fast rate and it is consumed as it is fed. When the pressure reaches 350 psi the reaction is terminated and the product is discharged, weighed and analyzed. The butane conversion is 80 percent. Allowance is made for ethanol to be oxidized to acetic acid with 90 percent efficiency and after that is taken into consideration the efficiency from butane to acetic acid is 75 percent. The product composition is roughly the same as that from an oxidation with methyl ethyl ketone as promoter.

The unit is then converted to continuous operation (Method II). The oxidation is started with ethanol as promoter and after it is proceeding satisfactorily, continuous feed is started, as follows

| Butane | 400 | parts/hr |
|---|---|---|
| Acetic acid solution of 3.5 percent cobaltous acetate and 2 percent ethanol | 400 | parts/hr |
| Nitrogen | 40 | l/hr |
| Oxygen | 200 | l/hr |

This reaction process smoothly and is stable. It is continued for 18½ hours before it is terminated voluntarily.

The continuous operation is repeated in runs of 30 hours, 30 hours, 16 hours, and 12 hours all voluntarily terminated.

Catalyst recycle is accomplished successfully in one of the runs.

EXAMPLES 6 to 10

The following examples follow Method II and are undertaken to compare the effect of various reaction temperatures. All runs are terminated voluntarily after a short time. Samples of gas are taken periodically and analyzed for carbon dioxide and butane by mass spectrometry. In these single-pass runs, the results are calculated by taking the incremental acetic acid produced in the reaction as the difference between that fed in the catalyst solution and the total amount in the product. Efficiencies to acetic acid and other products are calculated on carbon content on the basis of the products accounted for.

Conditions and results are reported in Table I below. Catalyst solution is made up of 3.5 percent cobaltous acetate, tetrahydrate, 2% ethanol, balance acetic acid. Nitrogen is fed at 40 liters per hour.

TABLE 1

| Ex. | Temp. °C | Pressure psig. | Time Hours | Parts butane | Parts Catalyst Solution | O$_2$ Feed Rate liters per hour | Total Wt. Moles | Total Parts Prod. | H$_2$O | Butane | Ethanol |
|---|---|---|---|---|---|---|---|---|---|---|---|
| 6 | 140 | 500 | 4 |  | 9364 | 650 | 116.5 | 14,032 | 8.66 | 0.35 | 0.05 |
| 7 | 140 | 500 | 6 | 13,260 | 9238 | 650 | 175 | 16,435 | 10.12 | 0.43 | 0.05 |
|   | 140 | 500 | 3 |  | 5618 | 650 | 87.5 | 9,015 | 9.07 | 0.44 | 0.04 |
| 8 | 150 | 500 | 5 | 5116 | 11,460 | 350 | 78.3 | 14,420 | 5.8 | 0.65 | 0.04 |
|   | 150 | 500 | 2 | 2894 | 4370 | 490 | 58.5 | 5,921 | 6.90 | 0.47 | 0.06 |
| 9 | 120 | 500 | 4 | 2100 | 2250 | 250 | 41.3 | 4,128 | 9.78 | 0.80 | — |
| 10 | 130 | 500 | 4 | 2480 | 3105 | 350 |  | 5,506 | 10.05 | 0.65 | — |

Product Composition %

| Ex. | Acetone | Methyl Acetate | UNID | MEK | Ethyl Acetate | 2-butyl Acetate | N-butyl Acetate | Acetic Acid | Propionic Acid | Butyric Acid | Butyrolactone | Blow-Off Gas Volume Moles |
|---|---|---|---|---|---|---|---|---|---|---|---|---|
| 6 | 0.19 | 0.27 | 0.26 | 1.12 | 0.51 | 0.38 | 0.08 | 83.53 | 1.30 | 1.43 | 0.13 | 33.5 |
| 7 | 0.45 | 0.28 | 0.26 | 1.12 | 0.42 | 0.44 | 0.07 | 82.26 | 1.12 | 1.31 | 0.11 | 51.5 |
|   | 0.22 | 0.33 | 0.34 | 0.98 | 0.56 | 0.41 | 0.06 | 83.59 | 0.98 | 1.36 | 0.07 | 81.8 |
| 8 | 0.15 | 0.52 | 0.23 | 0.52 | 0.63 | 0.28 | 0.06 | 87.9 | 0.52 | 0.88 | 0.11 | 36.6 |
|   | 0.21 | 0.54 | 0.29 | 0.93 | 0.74 | 0.32 | 0.07 | 85.87 | 0.61 | 1.04 | 0.15 | 12.2 |
| 9 | — | 0.42 | 0.02 | 1.60 | 0.97 | — | — | 84.1 | 0.92 | 1.26 | 0.09 | — |
| 10 | — | 0.45 | — | 1.31 | 0.69 | — | — | 84.79 | 0.92 | 1.06 | 0.08 | — |

Blow-Off Gas Analysis / % Butane Efficiency To

| Ex. | CO$_2$ | Butane | N$_2$ | Acetic | Acetone | MEK | 2-Butyl-acetate | Methyl-acetate | UNID | Propionic Acid | Butyric Acid | Butyr-lactone | CO$_2$ |
|---|---|---|---|---|---|---|---|---|---|---|---|---|---|
| 6 | 32.76 | 41.40 | 23.0 | 70.0 | 1.0 | 625 | 1.71 | 1.09 | 0.77 | 5.30 | 6.45 | 0.60 | 7.93 |
| 7 | 37.04 | 28.78 | 30.0 | 73.5 | 1.75 | 465 | 0.91 | 0.85 | 0.90 | 3.40 | 4.40 | 0.38 | 8.63 |
|   | 13.0 | 71.9 | 10.5 | 71.5 | 0.95 | 470 | 1.60 | 0.95 | 1.35 | 3.26 | 5.32 | — | 10.32 |
| 8 | 25.5 | 42.5 | 29.0 | 65.7 | 1.19 | 444 | 1.96 | 3.23 | 4.44 | 3.24 | 6.15 | 0.72 | 11.70 |
|   | 31.5 | 43.8 | 24.0 | 67.1 | 1.25 | 635 | 1.84 | 2.65 | 1.67 | 3.09 | 5.83 | 0.83 | 9.40 |
| 9 | 34.2 | 13.0 | — | 77.2 | — | 627 | — | 1.50 | — | 3.48 | 4.02 | — | 7.72 |
| 10 | 33.9 | 13.3 | — | 77.8 | — | 537 | — | 1.61 | — | 2.73 | 3.65 | — | 8.85 |

| Ex. | Productivity to Acetic lbs/ft$^3$ | O$_2$ Balance | O$_2$ Effic. to Acetic | Butane Conv. % | Material Balance % | Butane Balance % |
|---|---|---|---|---|---|---|
| 6 | 14.5 | 93.2 | 45.4 | 25.3 | 98.5 | 100.3 |
| 7 | 16.1 | 96.2 | 50.3 | 24.3 | 93.5 | 91.8 |
|   | 14.8 | 92.6 | 46.7 | 27.6 | 98.4 | 98.5 |
| 8 | 7.4 | 96.1 | 42.5 | 16.8 | 95.3 | 92.6 |
|   | 9.6 | 86.2 | 39.5 | 24 | 98.3 | 101.6 |
| 9 | 5.6 | 98.8 | 55.6 | 39.5 | 98.0 | 95.5 |
| 10 | 7.2 | 99.1 | 52.0 | 42.8 | 97.1 | 92.0 |

UNID = unidentified

I claim:

1. A continuous process for the liquid phase oxidation of butane to provide acetic acid comprising
   a. admixing butane; a molecular oxygen-containing gas; initially a solvent comprising a carboxylic acid having 2 to 4 carbon atoms or a mixture of liquid products formed by the process; a cobalt catalyst; and ethanol in a reaction zone
      wherein, at the beginning of each cycle, the amount of butane is in the range of about 5 percent by weight to about 150 percent by weight provided that there is a molar excess of hydrocarbon over oxygen; the amount of cobalt is in the range of about 0.03 percent by weight to about 3 percent by weight provided that the cobalt is in the form of a salt soluble in the solvent; and the amount of ethanol is about 1 percent by weight to about 20 percent by weight, said percentages based on the weight of the solvent, and
   wherein the temperature is in the range of about 80°C to about 150°C; and the total reaction pressure and partial pressure of oxygen are sufficient to maintain the reaction in the liquid phase to form a mixture of liquid products including acetic acid; and
   b. passing the mixture of liquid products, the cobalt catalyst, and unreacted butane from step (a) into a separation zone
      wherein a portion of the acetic acid is separated and recovered, and
      wherein a portion of the mixture of liquid products in sufficient amount to provide solvent for step (a), the cobalt catalyst, and the unreacted butane are separated and recycled to the reaction zone.

2. The process defined in claim 1 wherein the amount of butane is in the range of 50 percent by weight to about 125 percent by weight; the amount of cobalt is in the range of about 0.3 percent by weight to about 1.5 percent by weight; the amount of ethanol is in the range of about 1.5 percent by weight to about 8 percent by weight; and the temperature is in the range of about 100° to about 140°C.

3. The procss defined in claim 2 wherein acetic acid is used as the solvent in the initial cycle.

* * * * *

UNITED STATES PATENT OFFICE
CERTIFICATE OF CORRECTION

Patent No. 3923882          Dated December 2, 1975

Inventor(s) Ben Wilton Kiff

It is certified that error appears in the above-identified patent and that said Letters Patent are hereby corrected as shown below:

Claim 2, line 2, before "50", insert --about--.

Signed and Sealed this second Day of March 1976

[SEAL]

Attest:

RUTH C. MASON
*Attesting Officer*

C. MARSHALL DANN
*Commissioner of Patents and Trademarks*